United States Patent [19]

Horner

[11] Patent Number: 5,394,330
[45] Date of Patent: Feb. 28, 1995

[54] SYSTEM AND METHOD FOR MONITORING AN OPERATING STATE OF AN ENGINE

[75] Inventor: Thomas G. Horner, Rockwall, Tex.

[73] Assignee: Texas Instruments Incorporated, Dallas, Tex.

[21] Appl. No.: 974,657

[22] Filed: Nov. 12, 1992

[51] Int. Cl.⁶ .......................... F02P 5/15; F02P 17/00
[52] U.S. Cl. ........................ 364/431.03; 364/431.01; 364/431.08; 123/425; 123/479; 73/35; 73/112; 73/116; 73/117.3
[58] Field of Search ............ 364/431.02, 431.08, 364/431.03; 123/425, 417, 416, 625; 73/112, 116, 660; 381/71

[56] References Cited

U.S. PATENT DOCUMENTS

| | | | |
|---|---|---|---|
| 4,002,155 | 1/1977 | Harned et al. | 73/35 R |
| 4,316,440 | 2/1982 | Yamaguchi et al. | 73/35 M |
| 4,331,117 | 5/1982 | Ginsburgh | 73/35 K |
| 4,345,558 | 8/1982 | Yamaguchi et al. | 73/35 K |
| 4,388,902 | 6/1983 | Latapie | 123/425 |
| 4,494,509 | 1/1985 | Long | 123/416 |
| 4,627,275 | 12/1986 | Henein et al. | 73/112 |
| 4,783,998 | 11/1988 | Sander | 73/660 |
| 4,821,194 | 4/1989 | Kawamura | 364/431.08 |
| 4,843,870 | 7/1989 | Citron et al. | 73/116 |
| 4,846,130 | 7/1989 | Jensen | 123/425 |
| 4,895,120 | 1/1990 | Tobinaga et al. | 123/417 |
| 4,896,639 | 1/1990 | Holmes | 364/431.08 |
| 4,971,007 | 11/1990 | Gopp et al. | 364/431.08 |
| 4,991,553 | 2/1991 | Kurihara et al. | 123/425 |
| 5,038,744 | 8/1991 | Martin et al. | 123/625 |
| 5,146,505 | 9/1992 | Pfaff et al. | 381/71 |
| 5,200,899 | 4/1993 | Ribbens et al. | 364/431.08 |

Primary Examiner—Kevin J. Teska
Assistant Examiner—Jacques Harold Louis-Jacques
Attorney, Agent, or Firm—Robby T. Holland; Wade James Brady, II; Richard L. Donaldson

[57] ABSTRACT

A method and system (10) are provided for monitoring an operating state of an engine (12). Data are measured (84) from the engine (12). The data are indicative of the operating state of the engine (12). The data are processed (86, 90, 92) according to a discrete Fourier transform. The operating state of the engine is monitored by processing (96–114) the discrete Fourier transform.

14 Claims, 3 Drawing Sheets

SYSTEM AND METHOD FOR MONITORING AN OPERATING STATE OF AN ENGINE

TECHNICAL FIELD OF THE INVENTION

This patent application relates in general to engine monitoring systems and in particular to a method and system for monitoring an operating state of an engine.

BACKGROUND OF THE INVENTION

Engine knock is an undesirable condition or operating state of an engine. In many situations, the engine operates most efficiently with incipient engine knock. Nevertheless, excessive engine knock can internally damage the engine.

The operating state of an engine can be monitored to detect engine knock. From the engine, indirect external operating conditions can be sensed by instrumentation, such as accelerometers and acoustic sensors, for outputting measurement signals in response thereto. Also, direct internal operating conditions can be sensed by instrumentation such as a cylinder pressure sensor for outputting measurement signals in response thereto.

At a fundamental characteristic frequency, such direct and indirect measurement signals can indicate the presence of engine knock by exceeding a threshold amplitude. Such a characteristic frequency can vary according to different engine configurations. For a given engine configuration, a characteristic frequency is relatively stable over the entire operating range of the engine.

According to one previous technique, a set of measurement signals is filtered by an analog bandpass filter to isolate measurement signals around a fundamental characteristic frequency. A processor analyzes the isolated measurement signals to determine whether a threshold amplitude is exceeded at the characteristic frequency. Typically, such a technique results in limited system performance by failing to suitably analyze a particular set of filtered measurement signals at multiple characteristic frequencies. Frequently, hardware size and system cost are undesirably increased by including additional analog bandpass filters. Moreover, such a technique is frequently difficult to implement and adapt for variations in process parameters such as characteristic frequency and pass band.

According to another previous technique, a digital bandpass filter isolates measurement signals around a characteristic frequency. As the levels of frequency selectivity and resolving power increase, such a technique can result in decreased system throughput, increased memory requirements, and increased computational intensity. Moreover, such a technique is frequently difficult to adapt for variations in process parameters such as measurement signal set size, sample rate, characteristic frequency and pass band.

In yet another previous technique, the set of measurement signals is processed according to a digital fast Fourier transform ("FFT"). Typically, a single FFT undesirably involves all frequency components of a set of measurement signals, resulting in decreased system throughput, increased memory requirements, and increased computational intensity.

Thus, a need has arisen for a method and system for monitoring an operating state of an engine, in which system throughput is increased relative to previous techniques. Also, a need has arisen for a method and system for monitoring an operating state of an engine, which are more readily implemented and adapted for variations in process parameters relative to previous techniques. Further, a need has arisen for a method and system for monitoring an operating state of an engine, in which a particular set of measurement signals is suitably analyzed at multiple characteristic frequencies. Moreover, a need has arisen for a method and system for monitoring an operating state of an engine, in which a particular combination of hardware size, system cost, and performance is more readily improved relative to analog bandpass electronic circuitry techniques for given levels of frequency selectivity and resolving power. Finally, a need has arisen for a method and system for monitoring an operating state of an engine, in which memory requirements and computational intensity are decreased relative to FFT techniques and digital bandpass filter techniques for given levels of frequency selectivity and resolving power.

SUMMARY OF THE INVENTION

In a method and system for monitoring an operating state of an engine, data are measured from the engine. The data are indicative of the operating state of the engine. The data are processed according to a discrete Fourier transform. The operating state of the engine is monitored by processing the discrete Fourier transform.

It is a technical advantage of the present invention that system throughput is increased relative to previous techniques.

It is another technical advantage of the present invention that a method and system are provided for monitoring an operating state of an engine, which are more readily implemented and adapted for variations in process parameters relative to previous techniques.

It is a further technical advantage of the present invention that a particular set of measurement signals is suitably analyzed at multiple characteristic frequencies.

In another technical advantage of the present invention, a particular combination of hardware size, system cost, and performance is more readily improved relative to analog bandpass electronic circuitry techniques for given levels of frequency selectivity and resolving power.

In a further technical advantage of the present invention, memory requirements and computational intensity are decreased relative to FFT techniques and digital bandpass filter techniques for given levels of frequency selectivity and resolving power.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1-4c of the drawings, like numerals being used for like and corresponding parts of the various drawings.

Figure 1:
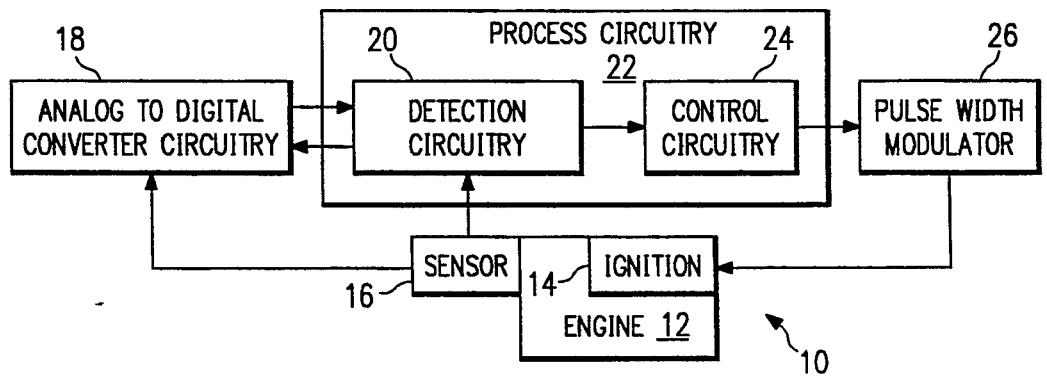
FIG. 1 is a block diagram of a system for monitoring an operating state of an engine according to the preferred embodiment.

FIG. 1 is a block diagram of a system, indicated generally at 10, for monitoring an operating state of an engine 12 according to the preferred embodiment. In an exemplary embodiment, system 10 monitors the operating state of engine 12 to detect an engine knock condition. In alternative embodiments, system 10 monitors engine 12 to detect other types of conditions besides or in addition to engine knock, such as a misfire condition.

In the exemplary embodiment, engine 12 is an internal-combustion engine, in which a crankshaft rotates to move multiple pistons back and forth within respective cylinders. For a particular cylinder of engine 12, its respective top dead center ("TDC") point is the point where the crankshaft extends the piston furthest into the cylinder before reversing the piston's direction of movement. An ignition system 14 is connected to engine 12 for igniting a flame within the cylinder, such as by operating a spark plug. Preferably, ignition system 14 ignites the flame at an optimum moment which varies relative to TDC according to one or more operating conditions such as crankshaft speed, engine load, and temperature. If the flame is ignited prematurely relative to the optimum moment, then engine knock can occur. Undesirably, engine knock can cause pressure within the cylinder to fluctuate wildly.

As shown in FIG. 1, a sensor 16 is connected to engine 12 for sensing one or more operating conditions of engine 12 and outputting measurement signals in response thereto. For example, sensor 16 can include one or more accelerometers for outputting vibration signals indicating vibration of engine 12. As another example, sensor 16 can include one or more acoustic sensors for outputting sound signals indicating sound of engine 12. Also, sensor 16 can include pressure sensors for outputting pressure signals indicating pressures of respective cylinders of engine 12. Moreover, sensor 16 outputs measurement signals indicative of the crankshaft speed of engine 12.

Sensor 16 is connected to analog-to-digital ("A/D") converter circuitry 18 and to detection circuitry 20 of process circuitry 22. In an exemplary embodiment, process circuitry 22 is a TEXAS INSTRUMENTS INCORPORATED TMS320 digital signal processor. A/D converter circuitry 18 is connected to detection circuitry 20 of process circuitry 22. Sensor 16 outputs the measurement signals to A/D converter circuitry 18. In response to the measurement signals input from sensor 16, A/D converter circuitry 18 converts the measurement signals into corresponding digital measurement data. In an alternative embodiment, A/D converter circuitry 18 converts the measurement signals according to setup specifications input from detection circuitry 20. For example, detection circuitry 20 can setup A/D converter circuitry 18 so that A/D converter circuitry 18 converts the measurement signals into measurement data at a specified frequency. In an illustrative embodiment, A/D converter circuitry operates at a conversion frequency of approximately 40-85 kHz with a data resolution of approximately 8-12 bits.

The measurement data from A/D converter circuitry 18 indicates magnitudes of the signals output by sensor 16. For example, if sensor 16 includes an accelerometer, then the measurement data from A/D converter circuitry 18 indicates magnitudes of vibrations sensed by sensor 16. Moreover, sensor 16 outputs to detection circuitry 20 an indication of a magnitude of the crankshaft speed of engine 12.

In response to data transfer commands from detection circuitry 20, A/D converter circuitry 18 outputs the measurement data to detection circuitry 20. In an illustrative embodiment, detection circuitry 20 normalizes inputs when external hardware gain switching is used with relatively low resolution A/D converter circuitry. In response to the measurement data input from A/D converter circuitry 18, detection circuitry 20 detects a condition of engine 12. In the exemplary embodiment, detection circuitry 20 detects the condition of engine knock. In an alternative embodiment, detection circuitry 20 detects a misfire condition.

Detection circuitry 20 is connected to control circuitry 24 of process circuitry 22. From detection circuitry 20, control circuitry 24 inputs the detected condition of engine 12. In the exemplary embodiment, detection circuitry 20 indicates the detected condition of engine 12 to control circuitry 24 according to a discretely variable intensity scale, such as by indicating (a) no detected engine knock, (b) low detected engine knock, (c) moderate detected engine knock, or (d) high detected engine knock. In an alternative embodiment, detection circuitry 20 merely indicates either affirmatively or negatively as to whether it detected any engine knock. In yet another alternative embodiment, detection circuitry 20 indicates the detected condition of engine 12 to control circuitry 24 according to a substantially continuous variable intensity scale.

Control circuitry 24 is connected to a pulse width modulator 26. In response to the detected condition of engine 12, control circuitry 24 outputs control signals to pulse width modulator 26 in consideration of the crankshaft speed of engine 12. Pulse width modulator 26 is connected to ignition 14.

In response to the control signals input from control circuitry 24, pulse width modulator 26 adjusts a pulse width within a duty cycle for controlling the timing of ignition 14. Accordingly, in the exemplary embodiment, system 10 responds to detected engine knock by adjusting the operation of ignition 14 in consideration of one or more operating conditions such as crankshaft speed, engine load, and temperature. In this manner, ignition system 14 ignites a flame within a cylinder of engine 12 at a more optimum moment relative to TDC, so that engine knock is diminished.

Figure 2:
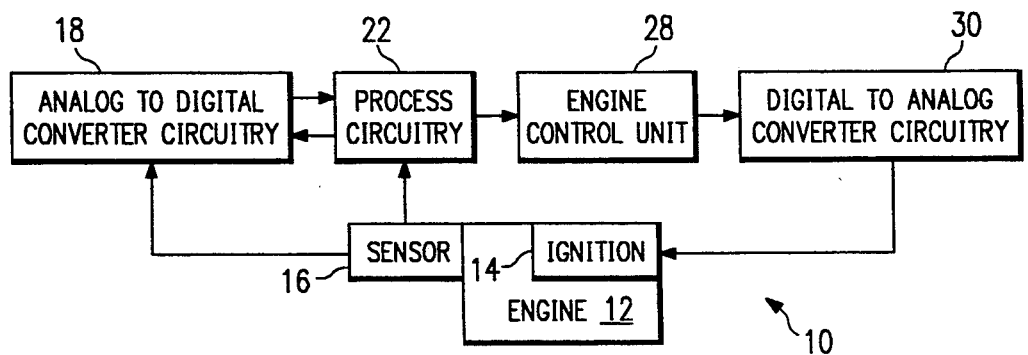
FIG. 2 is a block diagram of the system of FIG. 1 modified according to an alternative embodiment.

FIG. 2 is a block diagram of system 10 modified according to an alternative embodiment. In the alternative embodiment of FIG. 2, sensor 16 is connected to process circuitry 22, and A/D converter circuitry 18 is connected to process circuitry 22. A/D converter circuitry 18 converts measurement signals into corresponding digital measurement data. In response to data transfer commands from process circuitry 22, A/D converter circuitry 18 outputs the measurement data to process circuitry 22. In response to the measurement data input from A/D converter circuitry 18, process circuitry 22 detects a condition of engine 12. Process circuitry 22 is connected to an engine control unit 28 resident with engine 12. From process circuitry 22, engine control unit 28 inputs the detected condition of engine 12.

Engine control unit 28 is connected to digital to analog ("D/A") converter circuitry 30. In response to the detected condition of engine 12, engine control unit 28 outputs digital control data to D/A converter circuitry 30 in consideration of one or more operating conditions such as crankshaft speed, engine load, and temperature of engine 12. D/A converter circuitry 30 is connected to ignition 14. In response to the control data input from engine control unit 28, D/A converter circuitry 30 converts the control data into corresponding control signals for controlling the timing of ignition 14.

Figure 3:
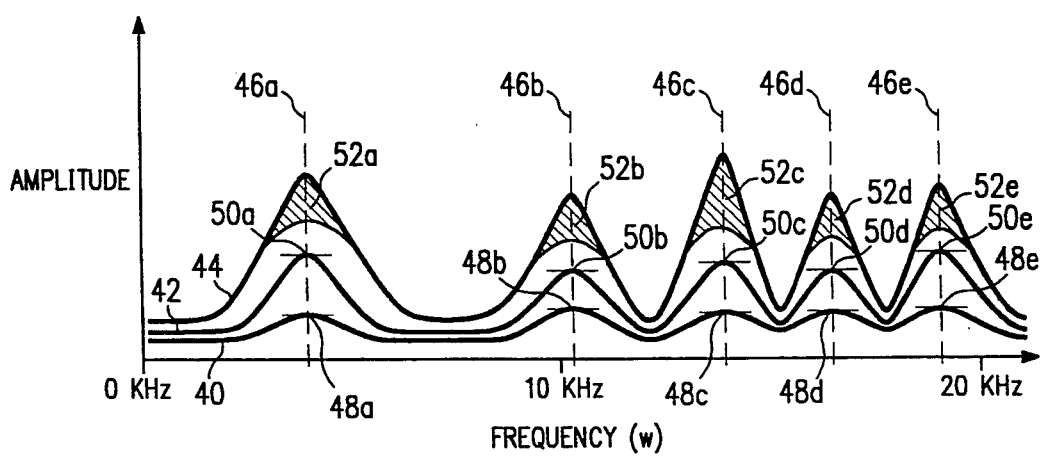
FIG. 3 is an illustrative graph of amplitude versus frequency curves representing three respective sets of measurement signals output by a sensor of the system of FIG. 1 for monitoring the operating state of the engine.

FIG. 3 is an illustrative graph of amplitude versus frequency ("$\omega$") curves 40, 42 and 44 representing three respective sets of measurement signals output at different times by sensor 16 of system 10 for monitoring the operating state of engine 12. Curve 40 represents measurement signals output by sensor 16 while engine 12 operates normally at relatively low revolutions per minute ("RPM"). Curve 42 represents measurement signals output by sensor 16 while engine 12 operates normally at relatively high RPM. Curve 44 represents a range of measurement signals output by sensor 16 while engine 12 operates with engine knock.

Each of curves 40, 42 and 44 has maximum amplitudes near five separate characteristic frequencies indicated by dashed lines 46a, 46b, 46c, 46d and 46e. In practice, the values and total number of such characteristic frequencies varies according to different engine configurations. As shown by curves 40, 42 and 44 for a given engine configuration, characteristic frequencies 46a, 46b, 46c, 46d and 46e are relatively stable over the entire operating range of engine 12. For example, the operating environment of engine 12 can vary according to crankshaft speed, temperature, and engine load.

Curve 40 has maximum amplitudes near levels 48a, 48b, 48c, 48d and 48e. Curve 42 has maximum amplitudes near levels 50a, 50b, 50c, 50d and 50e. Accordingly, while engine 12 operates at relatively low RPM, engine knock is indicated by amplitudes of curve 44 near ranges 52a, 52b, 52c, 52d and 52e which are significantly higher than expected threshold amplitude levels 48a, 48b, 48c, 48d and 48e, respectively. Similarly, while engine 12 operates at relatively high RPM, engine knock is indicated by amplitudes near ranges 52a, 52b, 52c, 52d and 52e which are significantly higher than expected threshold amplitude levels 50a, 50b, 50c, 50d and 50e, respectively.

Figure 4A:
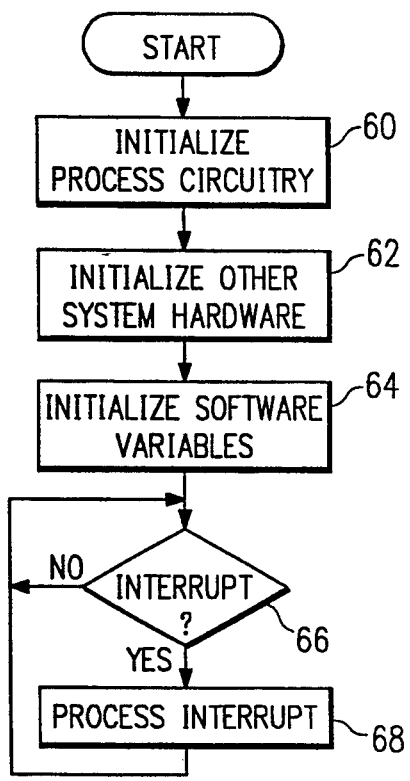
FIGS. 4a-c are flow charts of processes executed by the system of FIG. 1 for monitoring an operating state of an engine according to the preferred embodiment.
Figure 4B:
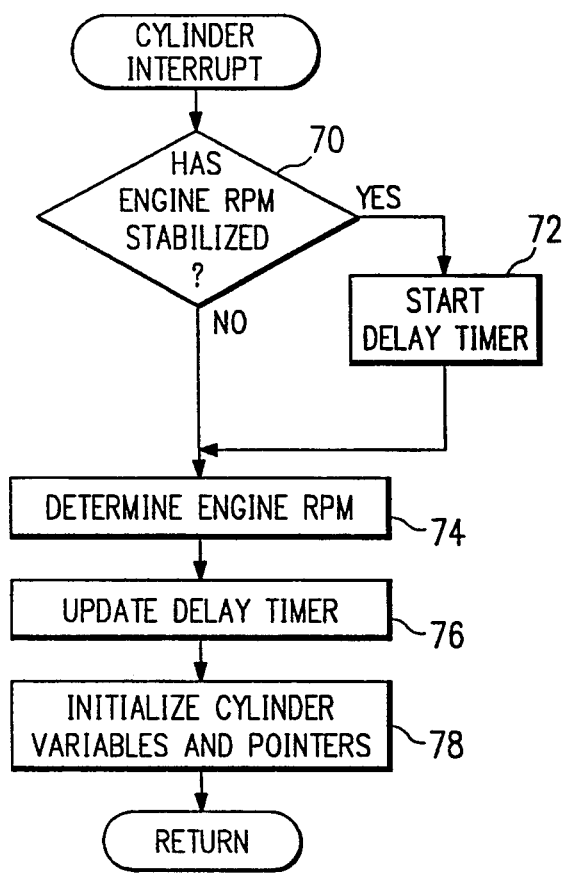
Figure 4C:
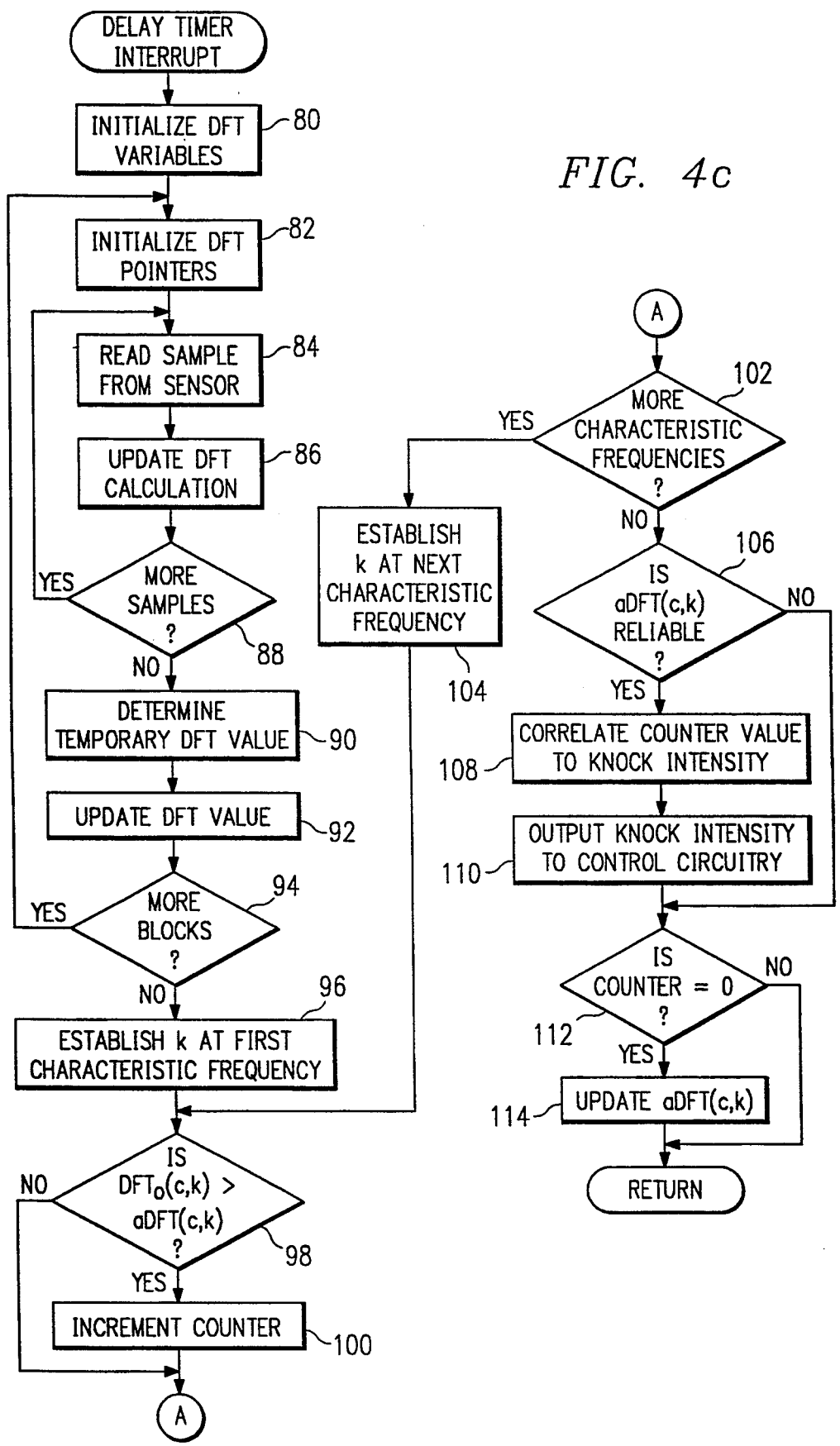

FIGS. 4a-c are flow charts of processes executed by system 10 for monitoring an operating state of engine 12 according to the preferred embodiment. Referring to FIG. 4a, execution begins at a step 60 at which system 10 initializes process circuitry 22. At a next step 62, other hardware of system 10 is initialized. At a next step 64, system 10 initializes software variables of process circuitry 22. Then, execution loops at a decision block 66 until process circuitry 22 determines that an interrupt is to be processed, as discussed further hereinbelow in connection with FIGS. 4b and 4c. If an interrupt is to be processed, process circuitry 22 processes the interrupt at a step 68, and execution returns to decision block 66 as shown in FIG. 4a.

Referring to FIG. 4b, process circuitry 22 is interrupted each time a piston of a cylinder reaches its respective TDC. In response to such a cylinder interrupt, at a decision block 70 process circuitry 22 determines whether an RPM of engine 12 has stabilized such that crankshaft speed of engine 12 is reliably known. If the RPM of engine 12 has stabilized, then at a step 72 process circuitry 22 starts a delay timer. Then, at a step 74 process circuitry 22 determines the RPM of engine 12.

Typically, engine knock is relatively unlikely in the period during which the crankshaft of engine 12 rotates from zero degrees through approximately ten degrees after TDC. Accordingly, in response to the RPM of engine 12, at a step 76 process circuitry 22 updates the delay timer in consideration of crankshaft speed, so that the delay timer is scheduled to expire contemporaneously with the crankshaft of engine 12 having rotated from zero degrees through approximately ten degrees after TDC. In response to expiration of the delay timer, process circuitry 22 is interrupted as discussed further hereinbelow in connection with FIG. 4c. In this manner, process circuitry 22 advantageously conserves processing time by delaying the detection of engine knock until the crankshaft of engine 12 has rotated from zero degrees through approximately ten degrees after TDC.

In an alternative embodiment, process circuitry 22 begins detecting engine knock in response to a cylinder interrupt without delaying for the period during which the crankshaft of engine 12 rotates from zero degrees through approximately ten degrees after TDC. After step 76, at step 78 process circuitry 22 initializes variables and pointers associated with the particular cylinder whose TDC resulted in the cylinder interrupt. After step 78, execution returns to decision block 66 of FIG. 4a.

Referring again to decision block 70, if the RPM of engine 12 has not stabilized, then a delay timer is not started. Instead, execution continues directly to step 74. In such a situation, the delay timer does not expire to interrupt process circuitry 22.

Referring to FIG. 4c, after the delay timer (started at step 72 of FIG. 4b) expires, process circuitry 22 is interrupted. In response to such a delay timer interrupt, process circuitry 22 detects engine knock. Advantageously, process circuitry 22 monitors the operating state of engine 12 by processing measurement data input from A/D converter circuitry 18 according to a discrete Fourier transform ("DFT"). In the preferred embodiment, process circuitry 22 processes the measurement data according to the following DFT:

$$X(k) = \sum_{i=0}^{N-1} x(i) \cdot \left[ \cos\left(\frac{2\pi i k}{N}\right) - j \cdot \sin\left(\frac{2\pi i k}{N}\right) \right] \tag{1}$$

where N is a number of measurement values over which the DFT is computed, where x(i) is the $i^{th}$ measurement value, where k is a frequency index, and where X(k) is the amplitude at frequency index k. Frequency index k ranges from 1 to N, where frequency index k=N/2 corresponds to the Nyquist frequency, $f_s/2$. The Nyquist frequency represents the maximum frequency component monitored by process circuitry 22. $f_s$ is the conversion frequency of analog-to-digital converter circuitry 18. Frequency index K=1 corresponds to $f_s/N$ representing the minimum frequency component monitored by process circuitry 22.

Equation (1) transforms time domain values of x(i) to a frequency domain value of X(k). Advantageously, amplitude at a specified frequency $\omega$ is readily monitorable by adjusting one or more of k, N and $f_s$. Accordingly, process circuitry 22 readily detects an engine knock condition at a particular characteristic frequency by adaptively tuning the values of one or more of k, N and $f_s$, such that a separate single point real DFT is determined for each characteristic frequency.

In response to a delay timer interrupt, at a step 80 process circuitry 22 initializes variables of the DFT. At a next step 82, process circuitry 22 initializes pointers of the DFT. At a next step 84, process circuitry 22 inputs a measurement value from sensor 16 through A/D converter circuitry 18.

At a next step 86, process circuitry 22 updates a direct calculation of the DFT, according to Equations (2) and (3), thereby separately summing the cosine and sine elements of Equation (1):

$$rDFT(c,k) = rDFT(c,k) + x(i) \cdot \cos\left(\frac{2\pi ik}{N}\right) \quad (2)$$

$$iDFT(c,k) = iDFT(c,k) - j \cdot x(i) \cdot \sin\left(\frac{2\pi ik}{N}\right) \quad (3)$$

where c is an index representing a particular cylinder of engine 12, and where k is a frequency index representing a particular characteristic frequency. rDFT(c,k) is the updated summation value of the cosine element of Equation (1) for cylinder c at the characteristic frequency represented by k. iDFT(c,k) is the updated summation value of the sine element of Equation (1) for cylinder c at the characteristic frequency represented by k.

Each cylinder c has its own set of summation values. Accordingly, the number of rDFT(c,k) summation values for a particular cylinder c is equal to the number of characteristic frequencies monitored by process circuitry 22. Similarly, the number of iDFT(c,k) summation values for a particular cylinder c is equal to the number of characteristic frequencies monitored by process circuitry 22. In an alternative embodiment, Equations (2) and (3) are replaced by the Goertzel implementation of DFT.

Advantageously, system 10 executes a single DFT for each selected characteristic frequency. In this manner, system 10 analyzes selected frequency components of a set of measurement signals, resulting in increased throughput, lower memory requirements, and lower computational intensity relative to typical previous digital techniques. For example, system 10 stores the most recent sample measurement value, together with a respective summation value associated with each selected characteristic frequency.

By comparison, a typical FFT involves all frequency components of a set of measurement signals, resulting in a significant amount of information to be sorted. Moreover, a typical FFT stores the entire set of measurement signals simultaneously, resulting in higher memory requirements. In yet another shortcoming of a typical FFT, all the samples are measured before computation of the FFT begins.

In the preferred embodiment, the DFT is updated for a particular cylinder c over a time period during which the crankshaft of engine 12 rotates from approximately ten degrees through approximately seventy degrees after TDC, although different time periods can be used in alternative embodiments. The time period is preferably coincident with the time during which engine knock is most likely to occur. In the preferred embodiment, the time period is subdivided into a variable number of sample block periods each having identical length. Accordingly, the number of sample block periods varies according to the crankshaft speed of engine 12. In an alternative embodiment, the time period is not subdivided but instead includes a single sample block period having a length varying according to the crankshaft speed of engine 12.

After step 86, at a decision block 88 process circuitry 22 determines whether any additional measurement values fall within the present sample block period. If yes, then execution returns to step 84. If the present sample block period has expired, then at a step 90 process circuitry 22 determines the squared magnitude of the DFT for each characteristic frequency of the particular cylinder c, according to Equation (4):

$$tDFT(c,k)^2 = rDFT(c,k)^2 + iDFT(c,k)^2 \quad (4)$$

where $tDFT(c,k)^2$ is denoted as a temporary DFT value.

At a next step 92, process circuitry 22 updates the DFT value, so that if $tDFT(c,k)^2$ is greater than $DFT_m(c,k)^2$ then $DFT_m(c,k)^2$ equals $tDFT(c,k)^2$ where m=0. Accordingly, $DFT_0(c,k)^2$ is the most recent value of $DFT_m(c,k)^2$. If $tDFT(c,k)^2$ is less than or equal to $DFT_0(c,k)^2$, then $DFT_0(c,k)^2$ is not modified by process circuitry 22.

After step 92, at a decision block 94 process circuitry 22 determines whether the time period includes any additional sample block periods. If yes, then execution returns to step 82. If the period does not include any additional sample block periods, then process circuitry 22 executes a post-processing detection and adapting technique.

The post processing detection and adapting technique begins at a step 96 at which process circuitry 22 establishes k representing a first characteristic frequency. Then, at a decision block 98, process circuitry 22 determines whether $DFT_0(c,k)$ is greater than a scaled average DFT, namely aDFT(c,k). If yes, then at a step 100 process circuitry 22 increments a counter value. After step 100, execution continues to a decision block 102. If $DFT_0(c,k)$ is less than or equal to aDFT(c,k), then execution continues to decision block 102.

By comparison, in an alternative embodiment for monitoring a misfire condition of engine 12, at decision block 98 process circuitry 22 determines whether $DFT_0(c,k)$ is less than aDFT(c,k). If yes, then at step 100 process circuitry 22 increments a counter value. After step 100, execution continues to decision block 102. In such an alternative embodiment, if $DFT_0(c,k)$ is greater than or equal to aDFT(c,k), then execution continues to decision block 102.

At decision block 102, process circuitry 22 determines whether any additional characteristic frequencies remain for cylinder c. If yes, then at a step 104, process circuitry 22 establishes k at the next characteristic frequency, and execution returns to decision block 98. After process circuitry 22 evaluates $DFT_0(c,k)$ relative to aDFT(c,k) for all characteristic frequencies of cylinder c, execution continues from decision block 102 to a decision block 106.

At decision block 106, process circuitry 22 determines whether a sufficient number of crankshaft revolutions have occurred, so that aDFT(c,k) is reliable. If yes, then at a step 108 process circuitry 22 correlates the counter value (discussed hereinabove in connection with step 100) to a knock intensity, such that the knock intensity is proportional to the counter value. At a next step 110, the knock intensity is output to control circuitry as discussed further hereinabove in connection with FIGS. 1 and 2. In an alternative embodiment, process circuitry 22 further outputs the characteristic frequencies at which engine knock is detected. In yet another alternative embodiment, process circuitry 22 further outputs the actual magnitude of knock intensity. After step 110, execution continues to a decision block 112. If at decision block 106 process circuitry 22 determines that aDFT(c,k) is not reliable, then execution continues to decision block 112.

At decision block 112, process circuitry 22 determines whether the counter value (discussed hereinabove in connection with step 100) is zero. If not, then execution returns to decision block 66 of FIG. 4a. If the counter value is equal to zero (indicating no engine knock), then execution continues from decision block 112 to a step 114. At step 114, process circuitry 22 updates aDFT(c,k) according to Equation (5):

$$aDFT(c,k) = K \cdot \frac{\sum_{m=0}^{M-1} DFT_m(c,k)}{M} \quad (5)$$

where K is a predetermined scaling factor having a value in the preferred embodiment from 5 to 10, and where M is a predetermined number of values of $DFT_m(c,k)$ to be averaged and scaled in order to update aDFT(c,k). By scaling the average according to the predetermined scaling factor K, the counter value is incremented at step 100 if $DFT_0(c,k)$ is K times the non-scaled average of previous values of $DFT_m(c,k)$.

After updating aDFT(c,k), at step 114 process circuitry 22 shifts the values of $DFT_m(c,k)$ array according to the following technique:

From $m=M-2$ to $m=0$, $DFT_{m+1}(c,k)=DFT_m(c,k)$ \quad (6)

Then, execution returns to decision block 66 of FIG. 4a.

In an alternative embodiment, aDFT(c,k) is updated according to Equation (7) instead of Equation (5):

$$aDFT(c,k) = K \cdot \left[ \frac{M \cdot aDFT(c,k) - DFT_M(c,k) + DFT_0(c,k)}{M} \right] \quad (7)$$

Relative to Equation (5), Equation (7) requires less processing time, but requires that M+1 values of $DFT_m(c,k)$ be stored.

Advantageously, system 10 achieves a diminished computational intensity relative to previous digital techniques. By diminishing the computational intensity, system 10 more readily achieves the preferred goal of completing the processing of data from a first cylinder's spark ignition prior to beginning the processing of data from a next cylinder's spark ignition. In this manner, system 10 is able to respond to engine knock for the first cylinder prior to an additional occurrence of the first cylinder's spark ignition. Alternatively, if system 10 does not complete the processing of data from the first cylinder's spark ignition prior to beginning the processing of data from the next cylinder's spark ignition, then system 10 can respond to engine knock for the first cylinder after one or more additional occurrences of the first cylinder's spark ignition.

Although the present invention and its advantages have been described in detail, it should be understood that various changes, substitutions and alterations can be made therein without departing from the spirit and scope of the invention as defined by the appended claims.

What is claimed is:

1. A method of monitoring an operating state of an engine, comprising the steps of:
    measuring data from a cylinder of the engine during the cylinder's ignition cycle by sampling data during equal time periods of a predefined time window of the cylinder's ignition cycle, said data being indicative of the operating state of the engine;
    processing said data according to a distributed discrete Fourier transform that transforms only preselected frequencies during the cylinder's ignition cycle so that the transform is completed prior to the ignition cycle of another cylinder of the engine; and
    monitoring the operating state of the engine by processing said discrete Fourier transform.

2. The method of claim 1 and further comprising the step of controlling the engine in response to said monitored operating state.

3. The method of claim 1 wherein said processing step comprises the step of processing said data according to a single point discrete Fourier transform.

4. The method of claim 1 wherein said monitoring step comprises the step of monitoring an engine knock operating state of the engine by processing said discrete Fourier transform.

5. The method of claim 1 wherein said monitoring step comprises the step of monitoring a misfire operating state of the engine by processing said discrete Fourier transform.

6. The method of claim 1 wherein said measuring step comprises the step of measuring a plurality of data from the engine, said data indicating vibration of the engine.

7. The method of claim 1 wherein said measuring step comprises the step of measuring a plurality of data from the engine, said data indicating sound of the engine.

8. The method of claim 1 wherein said measuring step comprises the step of measuring a plurality of data from the engine, said data indicating pressure in a cylinder of the engine.

9. The method of claim 1 wherein said measuring step comprises the step of measuring a sequence of sets of said data from the engine.

10. The method of claim 9 wherein said processing step comprises the step of processing multiple ones of said data sets according to a discrete Fourier transform, such that each said processed data set has at least one respective discrete Fourier transform value.

11. The method of claim 10 wherein said monitoring step comprises the steps of:
    determining an average of multiple ones of said discrete Fourier transform values; and
    comparing said average with one of said discrete Fourier transform values for monitoring the operating state of the engine.

12. The method of claim 11 wherein said determining step comprises the step of determining a scaled average of multiple ones of said discrete Fourier transform values.

13. A system for engine knock detection, comprising:
measuring circuitry for sampling engine knock characteristic data of a cylinder during evenly spaced intervals occurring in a predefined time window of the ignition cycle for the cylinder;
process circuitry coupled to the measuring circuitry and operable to process the data according to a distributed single point discrete Fourier transform calculation where part of the calculation is performed time a sample is taken, the calculation being completed prior to beginning the ignition cycle for another cylinder; and control circuitry coupled to the process circuitry and to the engine for controlling the ignition cycle for the another cylinder prior to the beginning thereof.

14. An engine ignition misfire detection system, comprising:
a sensor connected to the engine;
a processor coupled to the sensor and coupled to the ignition system of the engine for monitoring dominate frequencies characteristic of engine misfire by sampling said dominate frequencies produced by a cylinder of the engine upon ignition evenly over a period of time and processing the samples by a single point discrete Fourier transform calculation, the calculation being finished prior to ignition of another cylinder of the engine, the ignition system of the engine adjusting the ignition cycle of the another cylinder based upon results of the calculation.

* * * * *